United States Patent [19]

Hehl

[11] Patent Number: 5,007,816
[45] Date of Patent: Apr. 16, 1991

[54] INJECTION MOLDING MACHINE HAVING A DISPLACEMENT CONTROL FOR AN INJECTING UNIT CARRIER

[76] Inventor: Karl Hehl, Arthur-Hehl-Str. 32, 7298 Loburg 1, Fed. Rep. of Germany

[21] Appl. No.: 431,174

[22] Filed: Oct. 26, 1989

[30] Foreign Application Priority Data

Nov. 5, 1988 [DE] Fed. Rep. of Germany ....... 3837640
Nov. 5, 1988 [DE] Fed. Rep. of Germany ....... 3837641

[51] Int. Cl.$^5$ ............................................. B29C 45/76
[52] U.S. Cl. .................... 425/135; 264/401; 264/328.11; 425/190; 425/192 R; 425/574
[58] Field of Search ............... 264/40.1, 328.11; 425/135, 190, 192 R, 574, 575

[56] References Cited

U.S. PATENT DOCUMENTS

| 4,680,570 | 7/1987 | Hehl | 338/176 |
| 4,850,841 | 7/1989 | Hehl | 425/192 R |
| 4,865,534 | 9/1989 | Hehl | 425/575 |

FOREIGN PATENT DOCUMENTS 1860806  1/1961  Fed. Rep. of Germany .
1852612  3/1962  Fed. Rep. of Germany .
381420  10/1964  Switzerland .

*Primary Examiner*—Timothy Heitbrink
*Attorney, Agent, or Firm*—Spencer & Frank

[57] ABSTRACT

A carrier for the injecting unit of the injecting machine is adapted to be transferred to different operating positions for forming moldings having sprues in different arrangements. The frame is adapted to be driven by a control device, which has a screw drive and a displacement-measuring device and is adapted to be fixed in its operating positions. The control device has detachably been inserted into retaining openings of the injection molding machine by an axial installing movement in a direction which is transverse to the injection axis. As a result, the injection molding machine can be delivered by the manufacturer in different versions, inclusive of a more expensive version in which the transfer movement of the injecting unit to the various operating positions can be program-controlled, and a less expensive version, which does not permit of a program-control of the transfer movement. The machine can be converted from one version to the other with a minimum of work.

15 Claims, 9 Drawing Sheets

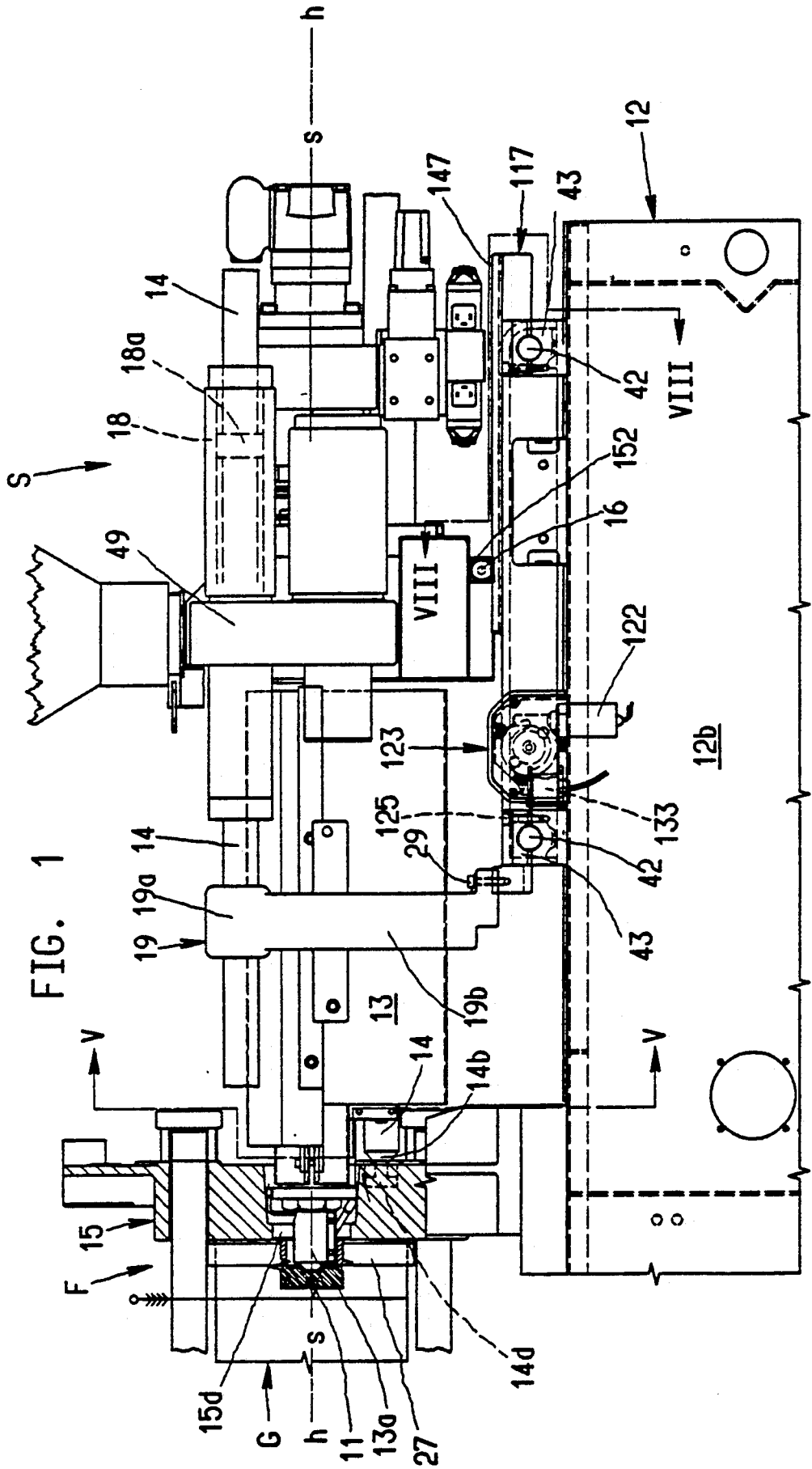

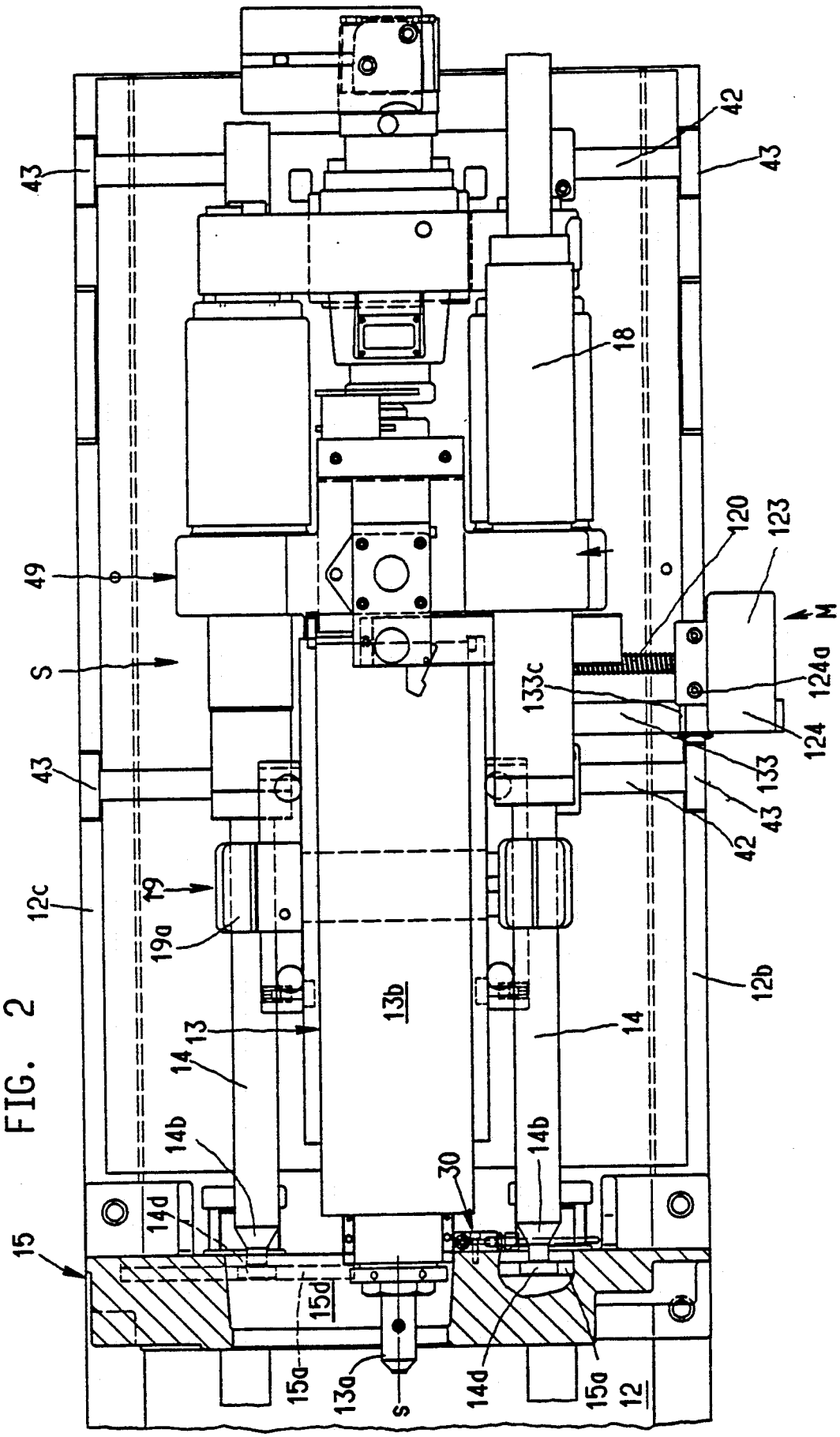

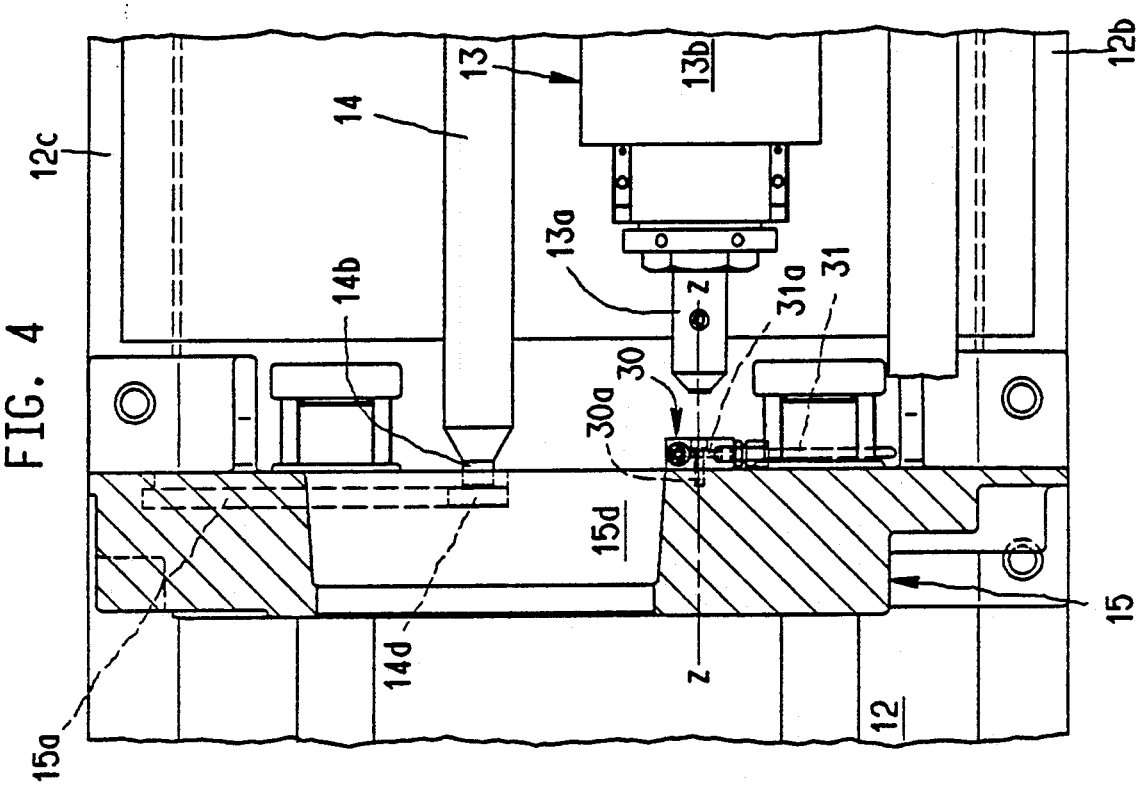
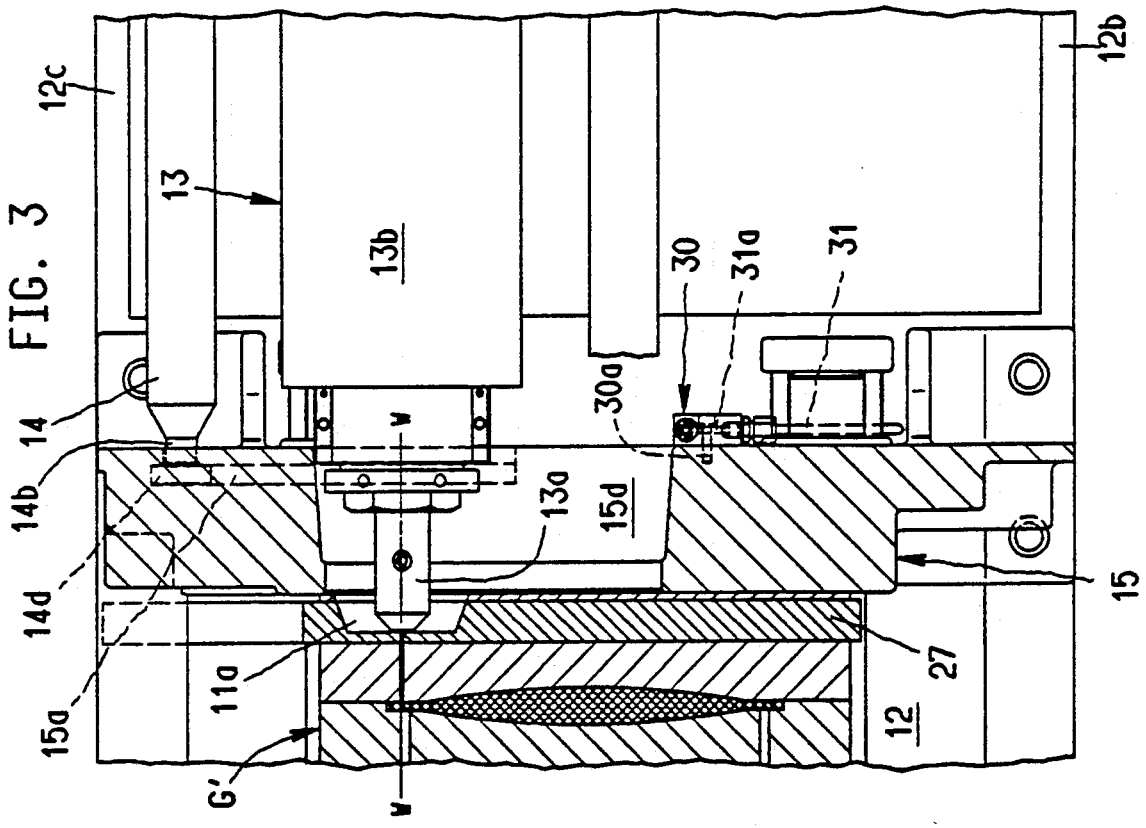

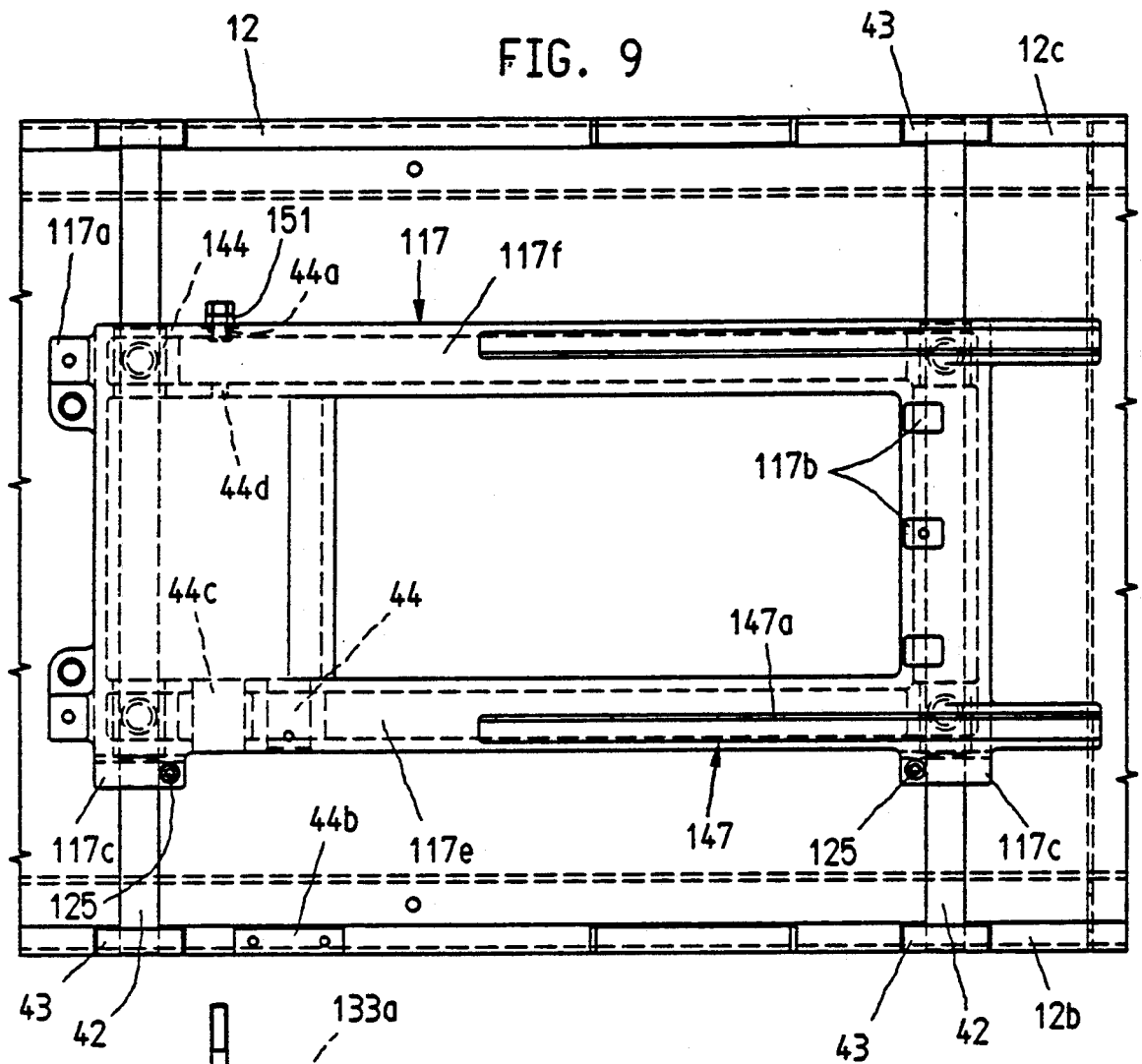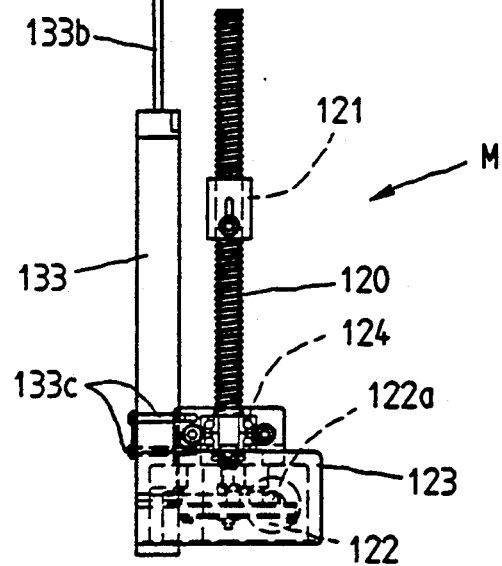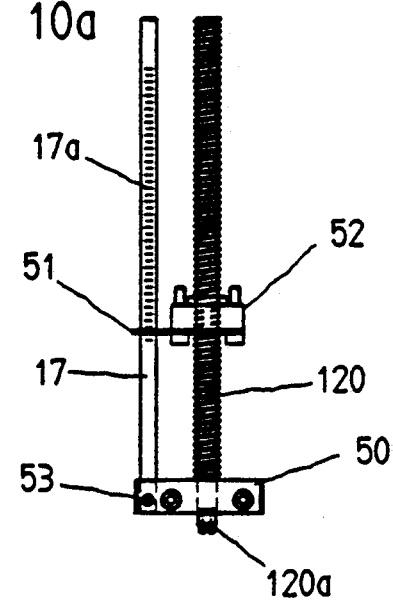

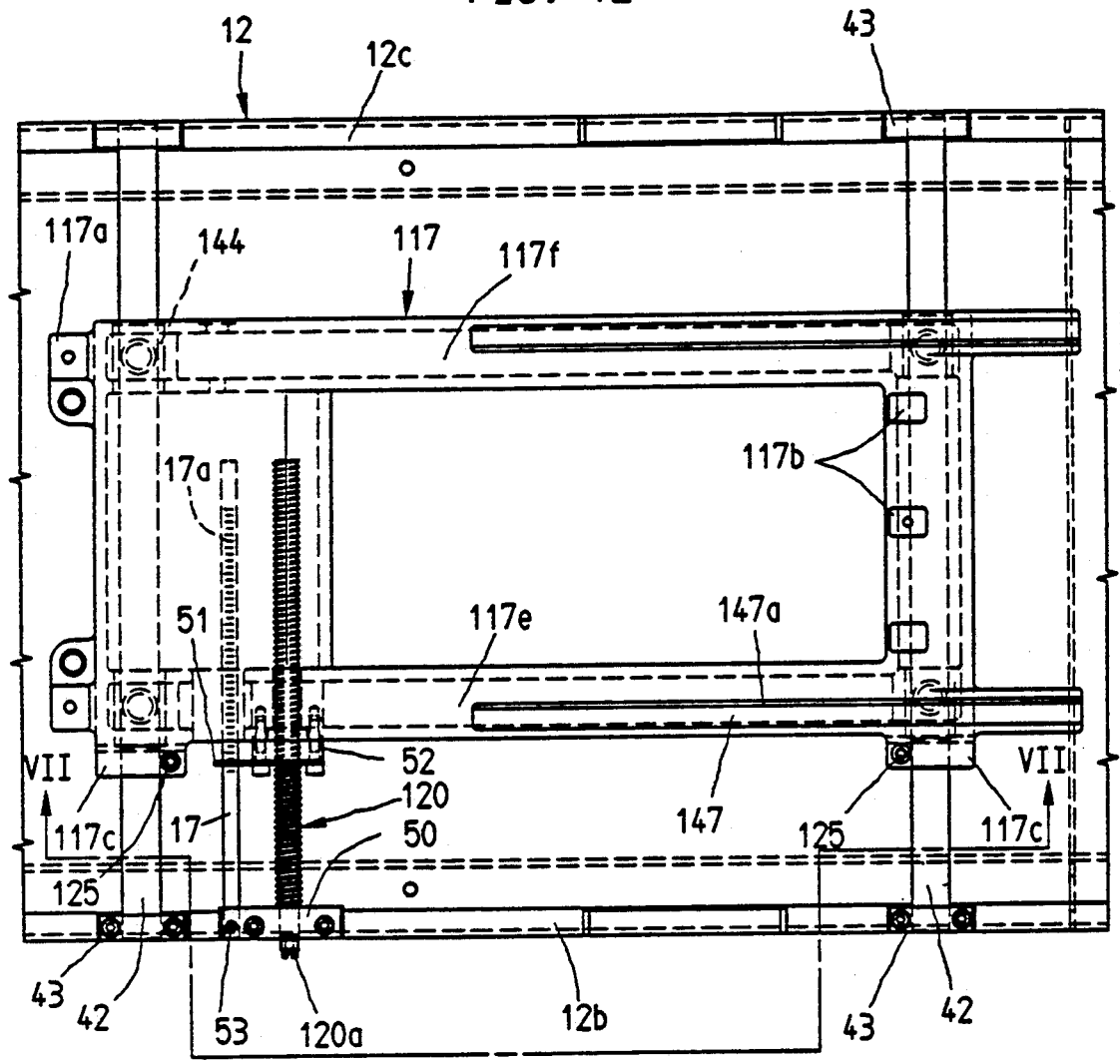
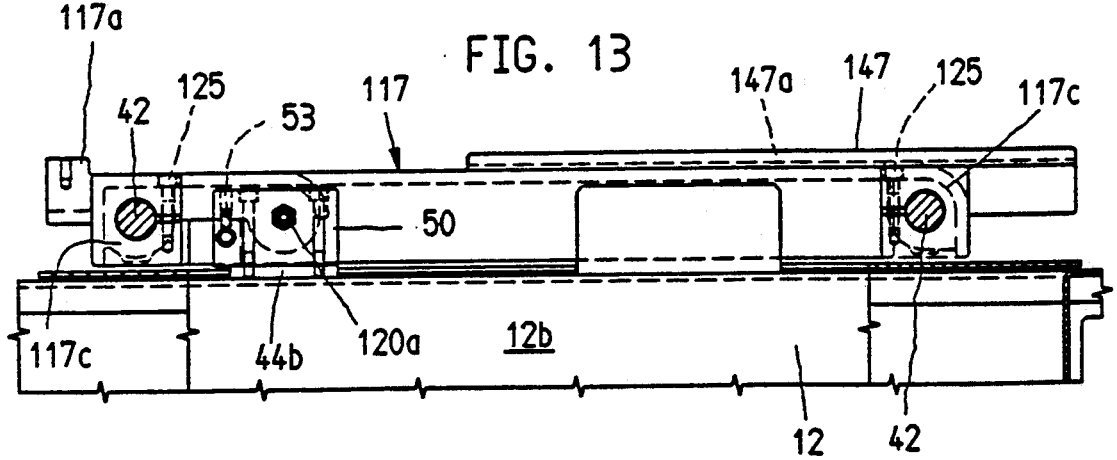

INJECTION MOLDING MACHINE HAVING A DISPLACEMENT CONTROL FOR AN INJECTING UNIT CARRIER

BACKGROUND OF THE INVENTION

1. Field of the Invention

This invention relates to an injection molding machine in which a first injection mold having a central gate and any of various second injection molds having an off-center gate for forming an asymmetrical sprue are adapted to be installed and which comprises a horizontal clamping unit, which is mounted on a machine pedestal, and an injecting unit, which is mounted on a cast iron carrier, which is slidably mounted on horizontal tracks, wherein said injecting unit is adapted to assume a first operating position, in which the injection axis is centrally disposed and in which the injecting unit is movable to the central gate of said first injection mold, said injecting unit is movable in a transfer plane, which extends through the central injection axis, from to any one additional operating positions, in which said injection axis is off center, by means of a screw drive, which is supported on the machine pedestal and engages the carrier for the injecting unit and is adapted to hold the injecting unit in each of said additional operating positions, in which said injecting unit is movable to the off-center gate of any of the second injection molds through an elongate opening, which extends in said transfer plane.

2. Description of the Prior Art

In an injection molding machine of that kind which is known from German Utility Model No. 1,852,612, the injection mold is movable from the first operating position for filling a center-gate mold to any of the additional operating positions for filling a linear mold having a non-symmetrical gate by a pivotal movement in the transfer plane. As a result, the less conventional linear mold-filling process, which is preferably used to make plastic parts having large surfaces with use of a lateral sprue, may be carried out in the same injection molding machine in case of need whereas a shifting or swiveling of the injecting unit for pouring into the parting line of the mold is not required.

In a comparable injection molding machine which is known from German Utility Model No. 1,860,806 and Swiss Patent Specification No. 381,420, a parallel displacement in a horizontal or vertical direction can be imparted to the carrier for the injecting unit by means of a hydraulic shifting cylinder or by means of a screw drive to move the injecting unit to various operating positions.

Finally, it is also known to measure a displacement and particularly to control the relative movement of subassemblies of a machine, such as an injection molding machine, by means of linear potentiometers (see U.S. Pat. No. 4,680,570; prospectus of Novo-Technik KG, Offterdinger GmbH & Co., Horbstrasse 12, D-7302 Ostfildern 1).

SUMMARY OF THE INVENTION

It is an object of the invention so to improve an injection molding machine which is of the kind described first hereinbefore that various requirements specified by the customers from the aspect of injection molding technology and various financial capabilities of the customers can better be taken into account because the injection molding machines can be delivered by the manufacturer in different versions, namely, in a more expensive version, in which the transfer of the injecting unit to the various operating positions can be program-controlled, and a less expensive version, which does not permit of a program control of the transfer movement and which can be converted with a minimum expenditure to the version which permits of a program control of the transfer movement.

That object is accomplished in accordance with the invention in that a control device is provided, which comprises a displacement-measuring device and the screw drive and is operable under program control and serves to control the displacement of the carrier for the injecting unit, and said control device is detachably mounted in retaining openings of said carrier and is adapted to be inserted into and removed from said retaining openings by an axial movement of said control device in a direction which is transverse to the injection axis.

In accordance therewith a horizontally displaceable carrier will be included in the basic equipment of the injection molding machine even when such displacement is not specified for the machine as purchased. For this reason it is possible to sell the machine even to customers who do not intend to change their injection molding programs from one mode of mold filling to another (central mold filling or linear mold filling). If such customer at a later time desires to use other injection molding programs which require a different location of the gate, that desire can be taken into account in that the carrier for the injecting unit is manually shifted. If the customer subsequently desires to operate the machine in a fully automatic mode, the injection molding machine can be converted to the programmable version with a relatively low expenditure and a very small amount of assembling work. It will also be possible to convert one or more injection molding machines in which the transfer movement can be program-controlled to the simple version which cannot be program-controlled if programmable vesions are required but not existent at a different manufacturing location. In that case control devices can be transferred from the first manufacturing location to the additional manufacturing location. It is apparent that such injection molding machines can be adapted to changing production requirements.

The carrier for the injecting unit suitably consists of a rectangular cast iron frame, which has longitudinal side bars integrally formed with track ribs, on which the injecting unit is guided along vertical and horizontal guiding surfaces as it is periodically moved into and out of engagement with the injection mold. Such cast iron frame can be made at relatively low cost to permit an insertion and removal of the control unit by a simple operation and will also ensure an excellent guidance during the injection molding cycles. That frame can also be clamped in a simple manner to the track rods if the frame is provided with clamping sleeves, which are adapted to be clamped to the track rods by clamp screws. In that case a simple manual transfer can be effected when a clamping screw has been loosened in the version which does not permit of a program control of the transfer movement.

In both versions outlined hereinbefore, the machine can be moved to an 'emptying position', in which the plasticizing cylinder can be emptied for a change to the processing of a different plastic so that the entire change of plastic can be automated. In that context it may be mentioned that a change of the mode of mold filling between a central and a linear filling of the mold is often accompanied by a change of the plastic. From that aspect an important contribution to a further rationalization of the manufacture of both versions will be rendered in that one version can be delivered with a chilling plate which is stationary but is easily detachably secured to the stationary mold support whereas the other version can be delivered without such chilling plate. The last-mentioned version can be converted to the version comprising a chilling plate with a minimum of assembling work and at low cost. By the provision of the chilling plate it is assumed that the plastic which has been ejected to empty the plasticizing cylinder will immediately solidify as soon as that plastic impinges on the cold surface of the chilling plate so that said plastic can then be disposed of. Such an inexpensive adaptation to the requirements of the customer has not been possible before. It was merely known in the art to provide a chilling plate which can be inserted in front of the through opening of the stationary mold support (DE 36 37 613 A1 and U.S. application Ser. No. 07/252,939) or to provide a chilling zone which is integrated in the stationary mold support as such (prior German Patent Application P 37 22 228.7 and U.S. application Ser. No. 07/192,709). But it has never been proposed before to provide two versions, each of which can be converted to the other and one of which is provided with a detachable stationary chilling plate.

BRIEF DESCRIPTION OF THE DRAWING

FIGS. 1 and 2 are, respectively, a side elevation and a top plan view showing the injection molding machine with a centrally disposed injection axis.

FIGS. 3 and 4 are views which are similar to FIG. 2 and respectively illustrate operative positions for a linear injection and for emptying.

FIG. 9 shows the same detail as FIG. 6 with the control device removed.

FIGS. 10 and 10a are top plan views showing the program-controlled control device and the manually operated one.

FIGS. 12 and 13 show these same detail as FIG. 6 with the measuring device inserted.

DETAILED DESCRIPTION OF THE PREFERRED EMBODIMENTS

Figure 5:
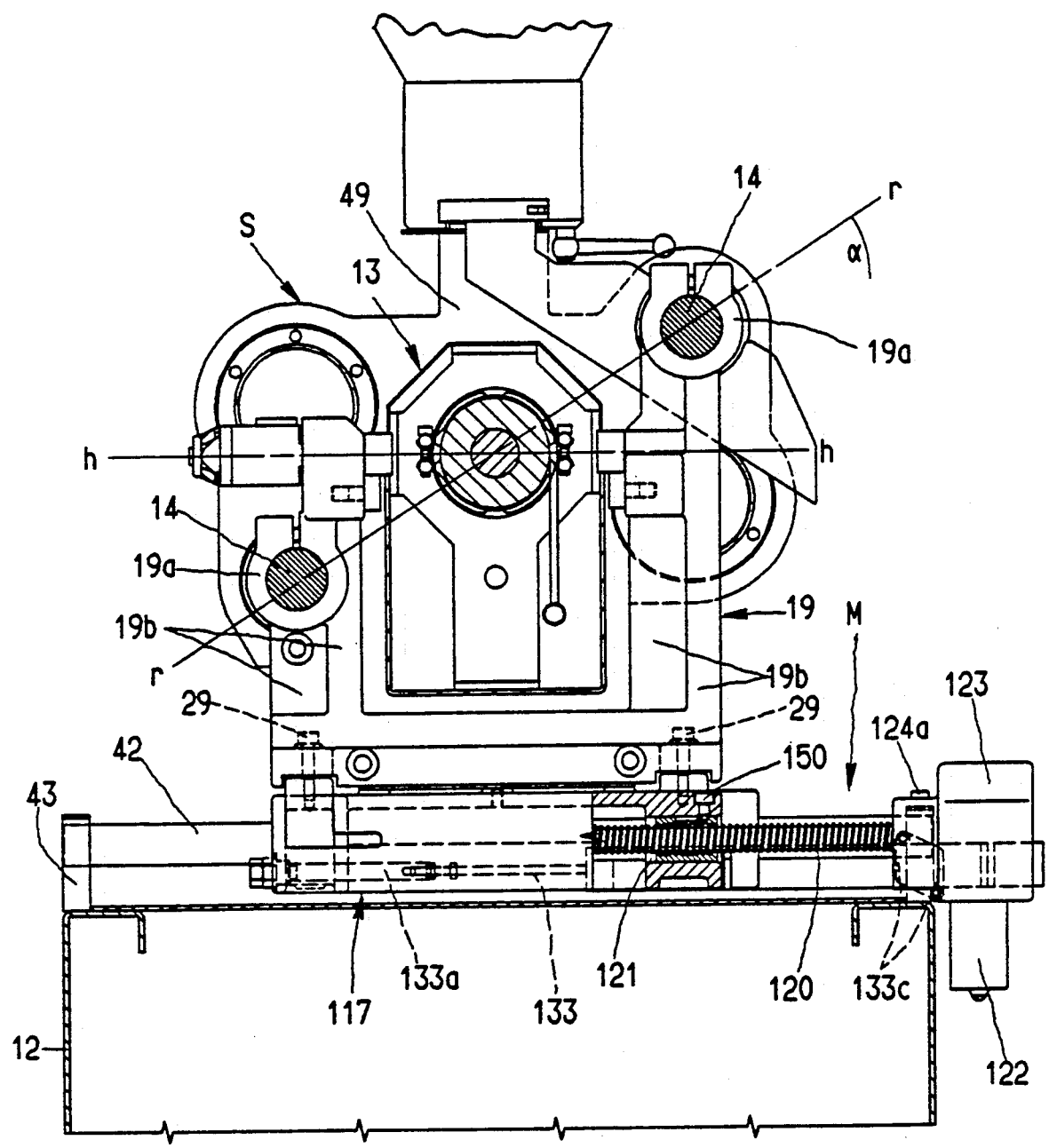
FIG. 5 is a sectional view taken on line V—V in FIG. 1.

Illustrative embodiments of the invention will now be described with reference to the drawing.

The general design of the injecting unit of the present injection molding machine has been described and shown in 16 and the corresponding U.S. Pat. No. 4,850,841 issued Jul. 25, 1989. For this reason only the features which are related to the present invention will be described hereinafter as far as the general design of the machine is concerned.

The clamping unit F and the injecting unit S are mounted on a parallelepipedic machine pedestal 12, which consists of sheet steel, and are operable each in a horizontal longitudinal direction. The injection mold G (in FIG. 1) and G' (in FIG. 3) comprises a stationary mold part, which is fixed in the clamping unit F and is adapted to be clamped by the stationary clamping plate 27 (in FIG. 3) to the stationary mold support 15. The mold support 15 comprises an opening 15d, which is asymmetrical with respect to the central injection axis s—s and constitutes a passage for the nozzle 13a of the plasticizing unit 13 of the injecting unit S. The plasticizing unit 13 has guards 13b.

The injecting unit S is longitudinally slidably mounted on rods, which constitute piston rods of hydraulic actuating cylinders 18 and have forward mounting ends 14d, which are axially fixed to the stationary mold support 15. On the rear, the injecting unit S is supported by supporting rollers 16 on a rectangular cast iron frame 117. The injecting unit S is movable by means of the hydraulic actuating cylinders 18 to the injection mold G or G' which is employed. For that purpose the injecting unit S is guided by the cylinder covers of the actuating cylinders 18 on the piston rods 14. The pistons 18a (FIG. 1) of the actuating cylinders 18 are secured to the piston rods 14 and are thus axially fixed. Besides, the piston rods are supported on the frame 117 by means of a U-shaped supporting member 19, as is apparent from FIGS. 1 and 2. The free ends of the legs 19b of the supporting member 19 consist of clamping sleeves 19a, which surround the piston rods 14. The supporting member 19 is a casting, which is integrally formed with and is directly secured by means of fixing screws 29 to supporting pads 117a, which are integrally formed with the frame 117. In a first operating position the injection axis s—s is coaxial to a central gate 11 of the injection mold G and the injecting unit S is movable through the opening 15d as far as to the gate 11 of the injection mold G.

Figure 11:
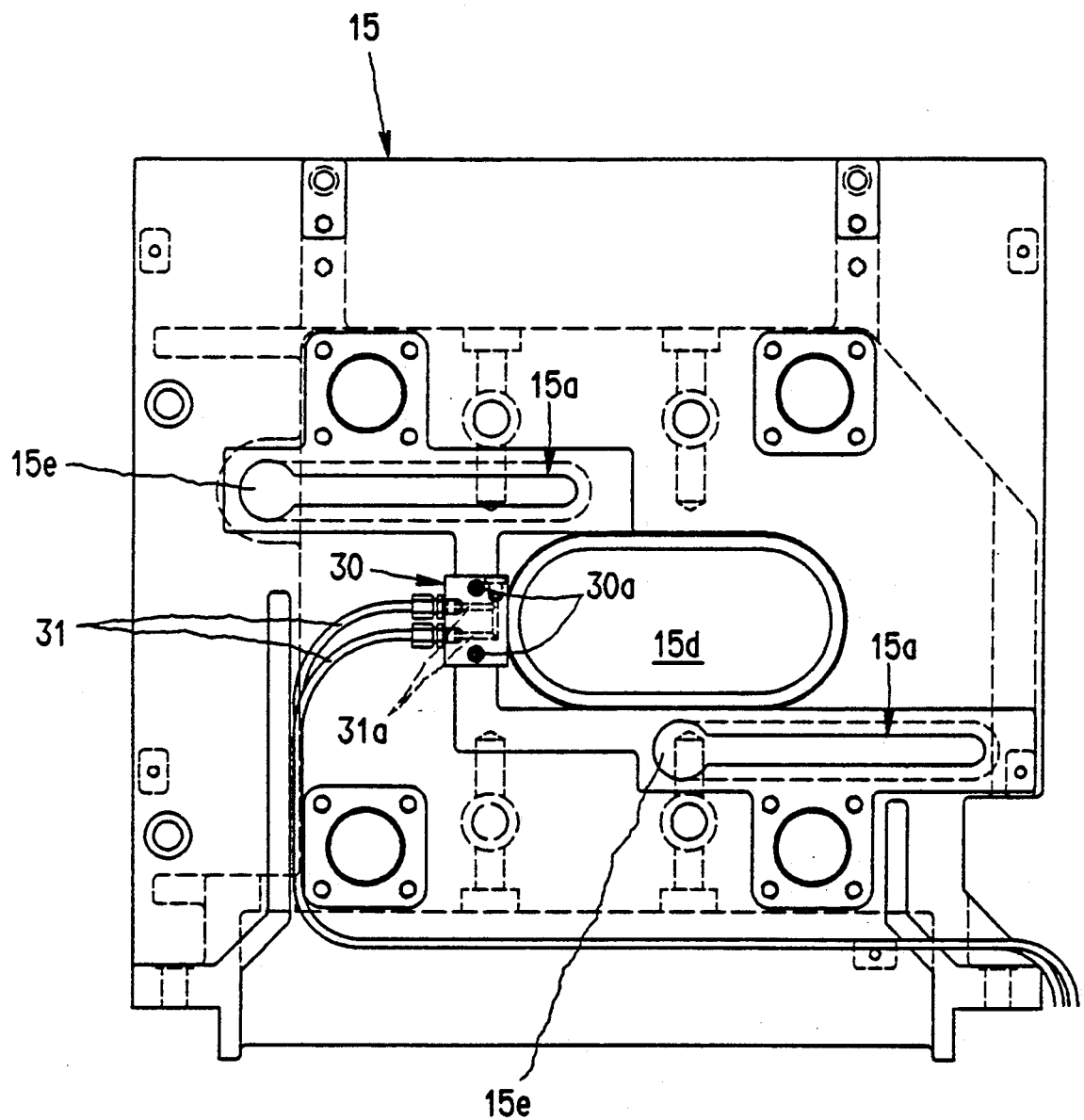
FIG. 11 is a rear view showing the stationary mold support.

The injecting unit is adapted to be transferred to at least one additional operating position, in which its injection axis w—w is off-center and the injecting unit is engageable with an injection mold G' (in FIG. 3) having a gate 11a and arranged to form an asymmetrical lateral sprue. The injecting unit is transferred in a transfer plane h—h, which is at right angles to the central injection axis s—s. The piston rods 14 are slidably mounted in transverse horizontal track grooves 15a of the mold support 15. Two track grooves 15a are provided, which are respectively disposed above and below the opening 15d. As the injecting unit S is transferred, the piston rods 14 move in the track grooves 15a. For an axial fixation the piston rods 14 are locked at their mounting ends 14d in the track grooves 15a adjacent to diametral constrictions 14b. The selectable further operating positions in which the injection axes w—w are off-center are disposed on one side of the central injection axis s—s in the horizontal transfer plane h—h (FIG. 5). From the first operating position for a central injection axis s—s the injecting unit can be moved to different operating positions (other-side operating positions) on the other side of the injection axis s—s. In one of said other-side operating positions the injecting unit S is axially removable from the mold support 15. For that purpose the track grooves 15a in that section which registers with the detaching position are provided with apertures 15e (FIG. 11) so that the mounting ends 14d are axially exposed. In a different other-side operating position the associated injection axis z—z intersects a chilling plate 30, which is mounted on the stationary mold support, as is particularly apparent from FIG. 4. In that different operating position (emptying position) the plastic can be ejected to empty the plasticizing cylinder. That 'emptying position' will have to be assumed if the injection molding is to be continued with a different plastic. Plastic which is ejected from the nozzle 13a to empty the plasticizing cylinder will impinge on a chilling plate 30, which is readily detachably secured to the mold support 15 by screws 30a. The chilling plate 30 is provided at the left-hand rim of the opening 15d and is adapted to be chilled by a chilling fluid flowing through a chilling passage 31a. The chilling fluid is circulated through lines 31 (FIG. 11). As the hot plastic impinges on the chilling plate 30, the plastic will solidify immediately and will fall down for disposal. The cast iron frame 117 which carries the injecting unit is movable on stationary track rods 42 in a horizontal direction which is at right angles to the injection axis s—s. By means of a control device M consisting of a screw drive and a linear potentiometer the frame is operable in accordance with a program. The track rods 42 are supported on the longitudinal walls 12b, 12c by supporting pads 43. For a fixation in positions corresponding to the different operating positions of the injecting unit S the frame 117 is adapted to be clamped on the stationary guide rods 42. For that purpose the frame 117 is preferably integrally formed with two radially and axially split clamping sleeves 117c (see particularly FIG. 6). To effect the clamping and unclamping, a clamp screw 125 is operated, which extends through the radial gap 117d. The screw drive comprises a nut 121, which cooperates with a drive screw 120 by means of a linear ball bearing and is received in a mating bore 44 of the side bar 117e of the frame 117 and is held in position there by means of a set screw 150, which can easily be loosened. A bearing bracket 44b is fixedly mounted below the drive screw 120 on the horizontally inturned edge portion of the longitudinal side wall 12b of the machine pedestal 12. The rotary bearing 124 for the drive screw 120 is easily detachably connected to the bearing bracket 44b. As a result, the position of the screw drive is determined by the mating bore 44 and by the bearing bracket 44b. A linear potentiometer 133 is associated with the screw drive. The carriage which carries the slide contact of the linear potentiometer is slidably mounted in the housing of that linear potentiometer. A rod 133b is connected to the carriage and protrudes from the housing of the linear potentiometer 133. During the assembling the control device M (FIG. 10) is moved to a final position by an installing movement, which is transverse to the injection axis s—s; w—w. In that finally installed position the rotary bearing 124 for the drive screw 120 is adapted to be connected to the locating bearing bracket 44b. During that installing movement the nut 121 of the screw drive slides into the mating bore 44 of the side bar 117e and the linear potentiometer 133 is inserted through the side bar 117e in an aperture 44c thereof (FIG. 9). The injecting unit S is fixed in its operating positions because the screw drive is self-locking. As is particularly apparent from FIGS. 6 and 9 the carriage which is disposed within the housing of the linear potentiometer 133 and carries the slide contact is screwed to a rod 133b. As a result, the nut 121 and the locating element 133a are inserted into the respective mating bores 44 and 44d of the associated side bars 117e and 117f of the frame 117 during the above-mentioned installing movement. After the installation the locating element, which is provided with external screw threads, terminates in a tapped bore 44a of the side bar 117f. For a detachable connection of the carriage of the linear potentiometer to the frame 117, a hollow screw 151 (FIG. 6) is provided, which is screwed into the internal screw threads of the tapped bore 44a and is screwed also to the locating element 133a. Owing to the screwed connection between the rod 133b of the carriage and the locating element 133a, the initial position in which the carriage is secured to the frame 117 can exactly be adjusted.

In the illustrative embodiment shown in the drawing the control device can quickly be installed in that the screws 124a at the rotary bearing 124 for the drive screw 120, the set screw 150 at the nut 121, and the hollow screw 151 in the tapped bore 44a are operated. For this reason that installation can be performed by the customer even by only slightly skilled labor.

Figure 6:
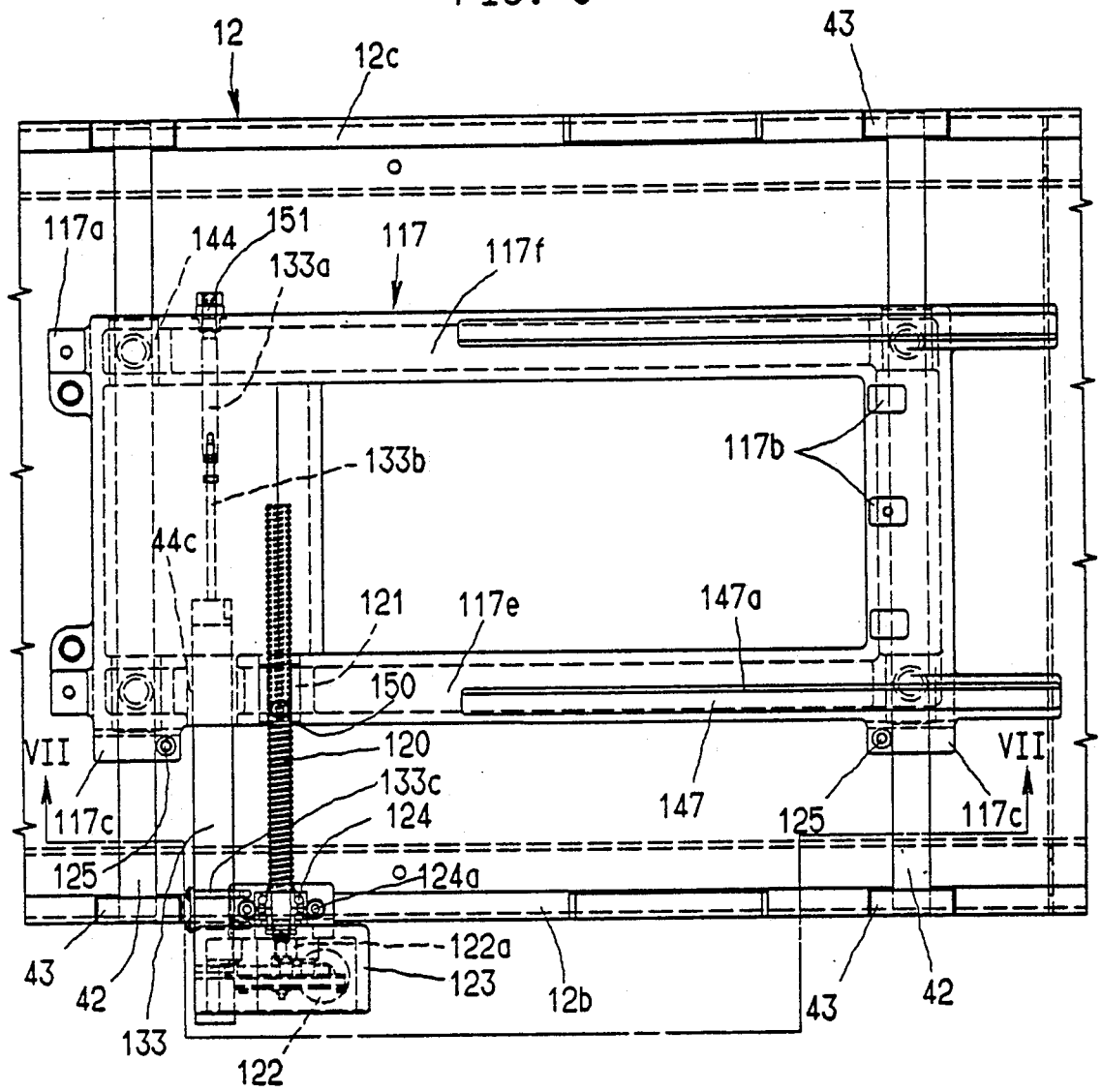
FIG. 6 shows a detail of FIG. 2 with the injecting unit removed.
Figure 7:
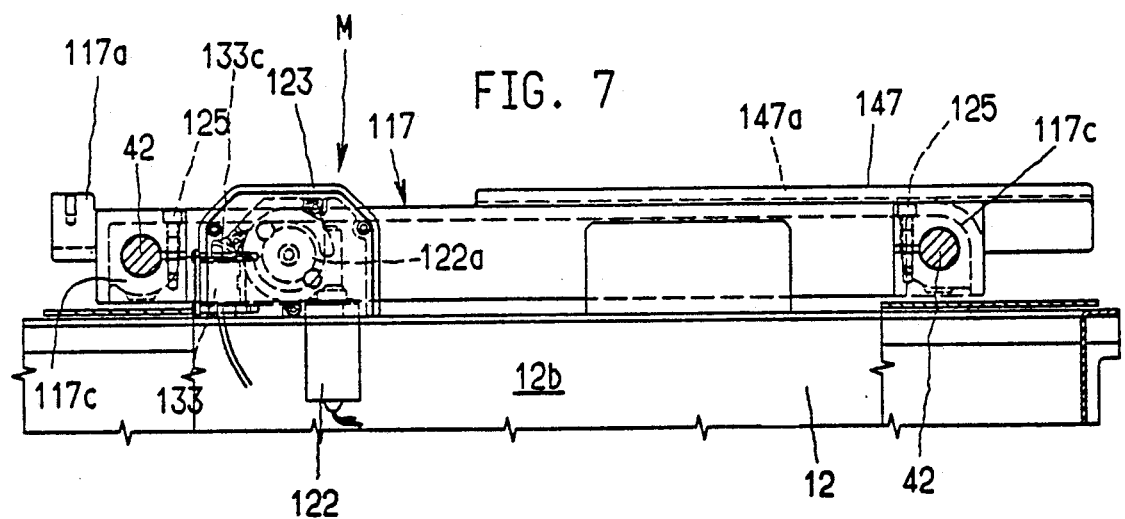
FIG. 7 is a sectional view taken on line VII—VII in FIG. 6.

As is apparent from FIGS. 6, 7, 10 the housing of the linear potentiometer 133 is fixedly connected to the rotary bearing 214 for the drive screw 120 by screws 133c. The motor drive consists of a unit including a step-down transmission (worm gear train) 122a and is secured to the outside surface of the rotary bearing 124 for the drive screw 120. As is particularly apparent from FIG. 6 that unit, which is enclosed by a housing 123, is disposed outside the vertical protection of the machine pedestal 12. The motor 122 has an axis which is at right angles to the drive screw 120 and the speed of the motor 122 is reduced by means of the worm gear train 122a. As is apparent from FIGS. 6 and 7 the cast iron frame 117 is integrally formed with track ribs, which have horizontal supporting surfaces 147 for supporting rollers 16 (FIG. 1, 8) of the injecting unit S. The track ribs are also formed with vertical guiding surfaces 147a for cooperation with guide pins 148 for a lateral guidance of the injecting unit S. From the linear potentiometer 133 the computer of the injection molding machine receives the signals which are required to define the desired operating position of the injecting unit. For a movement of the injecting unit S to all positions, inclusive of the 'emptying position' and the position in which the injecting unit can be removed, it is sufficient to impart a horizontal movement to the carrier for the injecting unit and to move the injecting unit S horizontally to the injection mold G or G' in dependence on the program of the computer. For the transfer of the injecting unit to the various operating positions the mounting ends 14d of the piston rods 14 are released in the track grooves 15a as soon as the backpressure which is due to the engagement of the nozzle with the injection mold G or G' has been eliminated because the injecting unit has been moved away from the mold. The flow of the chilling fluid through the chilling passage 31a of the chilling plate 30 can also be controlled in dependence on the transfer of the injecting unit S to its 'emptying position' in accordance with the program of the computer. The axes of the piston rods 14 of the injecting unit S and of the actuating cylinders 18 lie in a plane r—r (FIG. 5), which extends through the central injecting axis s—s and which includes an angle α with the horizontal.

Figure 8:
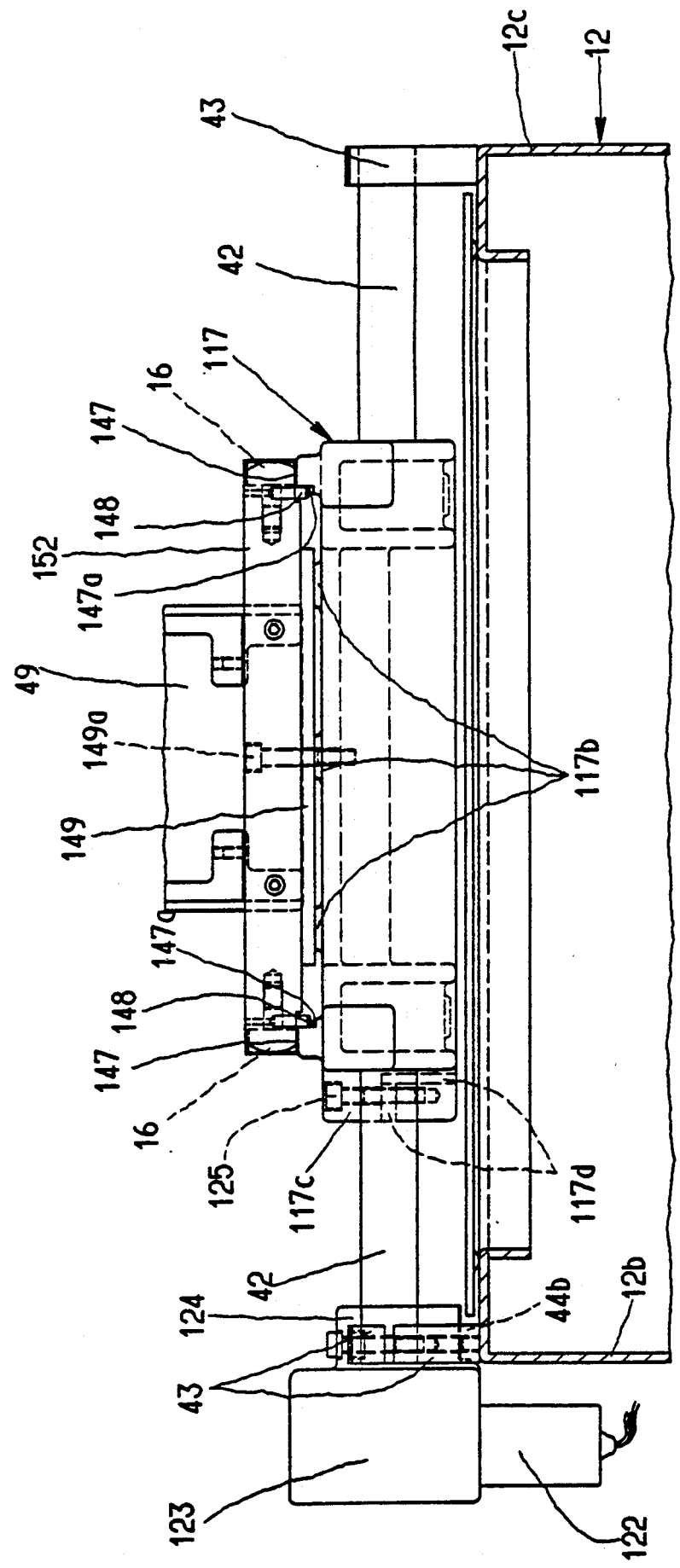
FIG. 8 is a sectional view taken on line VIII—VIII in FIG. 1.

As is particularly apparent from FIG. 1 in conjunction with FIG. 8 the supporting rollers 16 are rotatably mounted in a bar 152, which is secured to the underside of a base member 49 of the injecting unit. This is also applicable to the guide pins 148. To hold the machines in position during a transportation, the injecting unit S, which can roll axially on the track ribs, can firmly be connected to the frame 117 by a screw 149a.

The track rods 42 can be held in position by a locking bar 149, as is particularly apparent from FIG. 8. For the fixation the locking bar 149 is pushed onto projections 117b of the frame 117 in such a manner that the supporting rollers 16 and the guide pins 148 will be relieved from the full weight of the injecting unit S when the screw 149a has been tightened.

As is apparent from FIGS. 1 and 6 the supporting member 19 rests on supporting surfaces of supporting pads 117a, which are integrally formed with the frame 117. In the concrete embodiment shown, the frame 17 is displaceably mounted on the track rods 42 by means of linear ball bearing bushings 144 so that even heavy injecting units S can easily be manually displaced to various operating positions. The plasticizing unit 13 is provided on all sides with protective guards 13b.

As is particularly apparent from FIG. 9, the frame 117 is displaceable on horizontal track rods 42, which are supported on parallel longitudinal walls 12b, 12c of the machine pedestal 12.

In some cases it may be desirable to provide a chilling plate which is composed of semiconductor chilling elements (Peltier elements). This will mainly be advisable if plastics are processed which have unusual physical properties and which can be solidified by a temperature rise.

In case of a change from a 'conventional' plastic to an 'unusual' plastic the chilling plate consisting of semiconductor elements will be inverted so that the 'warm' side of that plate will then be impinged upon by the plastic which has been ejected during an emptying operation. The same result can be produced also in that the polarity of the Peltier chilling plate is reversed in accordance with the program. As will become apparent upon a comparison of FIGS. 12 and 13 with FIGS. 6, 7, 9 and 10 the control device M which has been inserted into the injection molding machine may be replaced by a mechanical measuring device, which comprises a measuring rod 17 provided with a measuring scale 17a.

Instead of the control device which has been described with reference to FIG. 10, a manually operable control device as shown in FIG. 10a may be mounted on the bearing bracket 44b of the injection molding machine. The drive screw 120 is provided with a pin 120a for the manual operation of said drive screw. The drive screw is connected by a bearing bracket 50 to a measuring rod, which is provided with a measuring scale 17a. The nut 52 which cooperates with the drive screw is connected to the frame 117 in such a manner that a marking plate 51 which is secured to the nut can move over the measuring scale provided on the measuring rod 17. The arrangement of the nut 52 on the frame 117 will permit an unobstructed view on the marking plate 51 so that the injecting unit S can repeatedly be adjusted to a predetermined position. A clamp screw 53 establishes a releasable connection between the measuring rod 17 and the bearing bracket 50.

I claim:

1. In an injection molding machine for selective use with a first injection mold having a first stationary mold part formed with a central gate and with at least one second injection mold having a second stationary mold part formed with an off-center gate for forming a non-symmetrical sprue, which machine comprises a machine pedestal defining a horizontal longitudinal direction and provided with horizontal tracks extending in a transverse direction at right angles to said longitudinal direction, a clamping unit mounted on said pedestal and operable in said longitudinal direction and comprising a stationary mold support, which is adapted to carry said first stationary mold part with said central gate disposed at a first location and to carry said second stationary mold part with said off-center gate disposed at a second location, said stationary mold support being formed with an opening which extends in a plane in said transverse direction and registers in said longitudinal direction with said first and second locations, an injecting unit defining an injection axis extending in said longitudinal direction, a cast iron carrier, which carries said injecting unit and is coupled thereto for a movement in said transverse direction and is displaceable on said track means in said transverse direction together with said injecting unit between a first operating position, in which said injection axis is aligned in said longitudinal direction with said first location, and at least one second operating position, in which said injecting axis is aligned in said longitudinal direction with said second location, a screw drive, which engages said machine pedestal, said screw drive being operatively connected to said carrier and operable to move said carrier and said injecting unit to each of said operating positions and to fix said carrier in each of said operating positions, actuating means for reciprocating said injecting unit relative to said carrier in each of said operating positions in said longitudinal direction through said opening of said stationary mold support to and from injecting positions adjacent to said first and second locations, the improvement residing in that said carrier is formed with at least one retaining opening, said at least one retaining opening extending in said transverse direction and having an open outer end, said screw drive being incorporated in a control device, said control device being operable under program control to control operation of said screw drive, said control device comprising a displacement measuring device for measuring displacement of said carrier along said tracks, and said control device being detachably mounted in said at least one retaining opening and is held therein against a movement relative to said carrier in said longitudinal direction and said control device being movable out of said retaining opening through said open outer end thereof in said transverse direction.

2. The injection molding machine set forth in claim 1, wherein said screw drive comprises a drive screw and a rotary bearing; said drive screw being rotatably mounted in said rotary bearing, said displacement measuring device comprises a linear potentiometer combined with said screw drive in a unit; said linear potentiometer comprises a housing, which is secured to said bearing, and said potentiometer comprises a slide contact holder which is detachably connected to said carrier.

3. The injection molding machine set forth in claim 1, wherein said screw drive comprises a drive screw and a rotary bearing in which said drive screw is rotatably mounted; said rotary bearing having an outer wall, a motor having an axis that is at right angles to an axis of said drive screw, said motor being operatively connected to said drive screw by a step-down worm gear train, and said motor and said worm gear train constitute a unit, said unit being disposed outside a vertical projection of said machine pedestal.

4. The injection molding machine set forth in claim 3, wherein said machine pedestal comprises two laterally spaced apart sheet metal side walls extending in said longitudinal direction, said tracks comprise track rods carried by said side walls, said carrier comprises a rectangular frame having first and second parallel side bars, said first side bar being adjacent to said rotary bearing and said first side bar being formed with an aperture and with a first bore where said first bore constitutes one of said retaining openings, and the second parallel side bar being formed with a second bore, said screw drive comprises a stationary nut cooperating with said drive screw and said nut being fitted in said first bore, one of said side walls comprises an inturned horizontal top flange, which carries a bracket that carries said rotary bearing, and said potentiometer extends through said aperture and comprises a locating member fitting said second bore.

5. The injection molding machine set forth in claim 4, wherein said screw drive comprises a linear ball bearing operatively connecting said drive screw with said nut.

6. The injection molding machine set forth in claim 4, wherein said frame is integrally formed with track ribs extending in said longitudinal direction and having horizontal supporting surfaces and vertical guiding surfaces, said injecting unit being provided with supporting rollers supported by said horizontal supporting surfaces and said injecting unit is further provided with guide pins in sliding engagement with said vertical guiding surfaces, said frame being integrally formed with clamping sleeves having a radially and axially extending gap and slidably mounted on said track rods and clamp screws being mounted in said sleeves and extend through said gaps and are adapted to be tightened to fix said sleeves to said track rods.

7. The injection molding machine set forth in claim 6, wherein a locking bar and a screw are provided for fixing said injecting unit to said frame.

8. The injection molding machine set forth in claim 1, wherein said stationary mold support carries a solidifying plate on that side of said opening of said mold carrier which is opposite to said injecting unit, said solidifying plate has a temperature-controlled surface facing said opening and is operable to maintain said temperature-controlled surface at a temperature at which molten plastic is adapted to solidify, said carrier being displaceable on said track means in said transverse direction to shift said injection unit to an additional operating position, in which said injecting axis is aligned with said solidifying plate, said screw drive being operable to move said injecting unit by way of said carrier to said additional operating position, and said actuating means being operable to reciprocate said injecting unit in said longitudinal direction relative to said carrier in said additional operating position to and from an ejecting position adjacent to said solidifying plate.

9. The injection molding machine set forth in claim 8, wherein said solidifying plate is a chilling plate.

10. The injection molding machine set forth in claim 8, wherein said solidifying plate is detachably mounted on said stationary mold support.

11. The injection molding machine set forth in claim 8, wherein said solidifying plate has on opposite sides, first and second temperature controlled surfaces and said solidifying plate being operable to maintain said first temperature-controlled surface at a first temperature and to maintain said second temperature-controlled surface at a second temperature, wherein said first temperature is greater than said second temperature and said solidifying plate being detachably mounted on said mold support with either of said first and second temperature-controlled surfaces facing said opening of said mold support.

12. The injection molding machine set forth in claim 8, wherein a first position assumed by said injection axis when said injection unit is in said second operating position is disposed on one side of a second position assumed by said injection axis when said injection unit is in said first operting position and a third position assumed by said injection axis when said injection unit is in said additional operating positon is disposed on an other side of the second position assumed by said injection axis when said injection unit is in said first operating position.

13. The injection molding machine set forth in claim 1, wherein said stationary mold support is formed with track grooves extending in said longitudinal direction, said actuating means comprise hydraulic actuating cylinders, which extend in said longitudinal direction and are fixed to said injecting unit, and piston rods extending axially through said cylinders and into said track grooves, fixing means are provided for axially fixing said piston rods in said track grooves, and a cast iron supporting member is provided, which supports said piston rods on said carrier and to couple said piston rods to said carrier in said transverse direction.

14. In an injection molding machine for selective use with a first injection mold having a first stationary mold part formed with a central gate and with at least one second injection mold having a second stationary mold part formed with an off-center gate for forming a non-symmetrical spruce, which machine comprises a machine pedestal defining a horizontal lognitudinal direction and provided with horizontal tracks extending in a transverse direction at right angles to said longitudinal direction, a clamping unit mounted on said pedestal and operable in said longitudinal direction and comprising a stationary mold support, which is adapted to carry said first stationary mold part with said central gate disposed at a first location and to carry said second stationary mold part with said off-center gate disposed at a second location, said stationary mold support being formed with an opening which extends in a plane in said transverse direction and registers in said longitudinal direction with said first and second locations, an injecting unit defining an injection axis extending in said longitudinal direction, a cast iron carrier, which carries said injecting unit and is coupled thereto for a movement in said transverse direction and is displaceable on said tracks in said transverse direction together with said injecting unit between a first operating position, in which said injection axis is aligned in said longitudinal direction with said first location, and at least one second operating position, in which said injecting axis is aligned in said longitudinal direction with said second location, a screw drive, which engages said machine pedestal, said screw drive being operatively connected to said carrier and operable to move said carrier and said injecting unit to each of said operating positions and to fix said carrier in each of said operating positions, actuating means for reciprocating said injecting unit relative to said carrier in each of said operating positions in said longitudinal direction through said opening of said stationary mold support to and from injecting positions adjacent to said first and second locations, the improvement wherein said machine pedestal is provided with a fixed bearing bracket, said carrier is provided with a bore, said bore extending in said transverse direction and having an open outer end, and a displacement measuring device for measuring displacement of said carrier along said tracks, said displacement measuring device comprising a measuring extending in said transverse direction, a measuring scale extending in said transverse direction and a sleeve slidably mounted on said measuring rod detachably fixed in said bore and having an end edge which is disposed outside said bore adjacent to said measuring scale.

15. In an injection molding machine for selective use with a first injection mold having a first stationary mold part formed with a central gate and with at least one second injection mold having a second stationary mold part formed with an off-center gate for forming a non-symmetrical sprue, which machine comprises a machine pedestal defining a horizontal longitudinal direction and provided with a horizontal tracks extending in a transverse direction at right angles to said longitudinal direction, a clamping unit mounted on said pedestal and operable in said longitudinal direction and comprising a stationary mold support, which is adapted to carry said first stationary mold part with said central gate disposed at a first location and to carry said second stationary mold part with said off-center gate disposed at a second location, said stationary mold support being formed with an opening which extends in a plane in said transverse direction and registers in said longitudinal direction with said first and second locations, an injecting unit defining an injection axis extending in said longitudinal direction, a cast iron carrier, which carries said injecting unit and is coupled thereto for a movement in said transverse direction and is displaceable on said tracks in said transverse direction together with said injecting unit between a first operating position, in which said injection axis is aligned in said longitudinal direction with said first location, and at least one second operating position, in which said injecting axis is aligned in said longitudinal direction with said second location, a screw drive, which engages said machine pedestal said screwdrive being operatively connected to said carrier and operable to move said carrier and said injecting unit to each of said operating positions and to fix said carrier in each or said operating positions, actuating means for reciprocating and injecting unit relative to said carrier in each of said operating positions in said longitudinal direction through said opening of said stationary mold support to and from injecting positions adjacent to said first and second locations, the improvement residing in that said carrier is formed with at least one retaining opening, said at least one retaining opening extending in said transverse direction and having an open outer end, said screw drive being incorporated in a control device, said control device being operable to control operation of said screw drive, said control device comprising a displacement measuring device for measuring displacement of said carrier along said tracks, said control device being detachably mounted in said at least one retaining opening and is held therein against a movement relative to said carrier in said longitudinal direction and being movable out of said retaining opening through said open outer end thereof in said transverse direction, said stationary mold support carrying a solidifying plate on that side of said opening of said mold carrier which is opposite to said injecting unit, said solidifying plate having a temperature-controlled surface facing said opening and being operable to maintain said temperature-controlled surface at a tempoerature at which molten plastic is adapted to solidify, said carrier being displaceable on said tracks in said transverse direction to shift said injecting unit to an additional operating position, in which said injecting axis is aligned with said solidifying plate, said screw drive being operable to move said injecting unit by way of said carrier to said additional operating position, and said actuating means being operable to reciprocate said injecting unit in said longitudinal direction relative to said carrier in said additional operating position to and from an ejecting position adjacent to said solidifying plate.

* * * * *